(12) United States Patent
Hu et al.

(10) Patent No.: US 8,584,666 B2
(45) Date of Patent: Nov. 19, 2013

(54) PRISM SHIELDS FOR A PARABOLIC TROUGH SOLAR COLLECTOR

(75) Inventors: Yongdan Hu, Bothell, WA (US); Nancy E. Wasson, Mount Laurel, NJ (US); Matthew M. Kapelanczyk, Baltimore, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 197 days.

(21) Appl. No.: 13/106,034

(22) Filed: May 12, 2011

(65) Prior Publication Data
US 2012/0285444 A1 Nov. 15, 2012

(51) Int. Cl.
*F24J 2/08* (2006.01)

(52) U.S. Cl.
USPC ............. 126/684; 126/904; 126/570; 285/45; 285/223; 285/226; 285/227; 285/300; 285/332

(58) Field of Classification Search
USPC ............ 126/684, 904, 570; 285/45, 300, 301, 285/226, 423, 222, 332, 227, 228, 229
See application file for complete search history.

(56) References Cited

U.S. PATENT DOCUMENTS

| 4,283,078 A * | 8/1981 | Ross et al. ...................... 285/45 |
| 6,705,311 B1 * | 3/2004 | Schwartzman et al. ...... 126/657 |
| 7,240,675 B2 * | 7/2007 | Eickhoff ........................ 126/652 |
| 2011/0220096 A1 * | 9/2011 | Margankunte et al. ....... 126/684 |

* cited by examiner

*Primary Examiner* — Kenneth Rinehart
*Assistant Examiner* — Bao D Nguyen
(74) *Attorney, Agent, or Firm* — Renner Kenner Greive Bobak Taylor & Weber

(57) ABSTRACT

A solar receiver assembly includes a tube adapted to carry a heat transfer medium and a glass envelope surrounding the tube and having opposed ends. An interface is disposed between each end and the tube so as to seal and support the tube from the envelope. And the receiver includes a prism disposed over the interface to divert incident radiation away from the interface and toward the tube and/or the glass envelope. The prisms may be provided with reflective and/or antireflective coatings to further optimize diversion of radiation from the interface.

14 Claims, 4 Drawing Sheets

US 8,584,666 B2

PRISM SHIELDS FOR A PARABOLIC TROUGH SOLAR COLLECTOR

TECHNICAL FIELD

Generally, the present invention is related to parabolic trough solar fields. In particular, the present invention is directed to the construction of a heat collection element sometimes referred to as a solar receiver. Specifically, the present invention is directed to prisms which are used to protect a glass-metal interface of the solar receiver to improve the overall efficiency of the solar field.

BACKGROUND OF THE INVENTION

Parabolic trough solar fields are used to collect radiation from the sun for conversion to a usable form of energy. The solar fields include parabolic trough reflectors which are mirrored surfaces configured to track the sun's movement across the sky and concentrate solar radiation onto a solar receiver. The mirrored surfaces reflect the sun's rays toward the solar receiver, also referred to as a heat collection element (HCE), maintained at a focal point of the reflector's parabolic shape. A heat transfer fluid flows through the HCE and is heated by the reflected and concentrated radiation. The fluid is then delivered to a heat transfer system and converted to electricity or other usable form of energy.

One problem area for these systems is the configuration of the solar receiver. The receiver includes a continuous metallic heat transfer tube surrounded by an evacuated cylindrical glass envelope, wherein the tubes are joined end to end. However, the glass envelopes are typically provided in shorter segment lengths and are not contiguous. Due to the extreme temperature variations and different coefficients of thermal expansion between the metal tube and glass envelope materials, a significant number of structural failures occur at the glass-metal interface. Known configurations use a bellows-type interface to maintain a desired seal and spacing between the transfer tube and the glass envelope. However, current bellow designs remain prone to failure at the glass-metal seal interface.

Known solutions include the use of shielding devices or mirrors to minimize heat at the interface. Shielding can be effective, but it does not always protect the interface when the sun is at an extreme angular relationship to the receiver. Although somewhat effective, the overall efficiency is reduced as the shields block sunlight from being directed to the receiver. Use of a mirror-type shield is somewhat more effective but is still lacking in that the re-directed light does not angularly adjust with the movement of the sun. As a result, some solar radiation is deflected away from the heat transfer tube and wasted. Therefore, there is a need in the art to more efficiently direct light away from the glass-metal interface so as to prevent failure thereof, and to improve the overall efficiency of the parabolic trough solar collector.

SUMMARY OF THE INVENTION

In light of the foregoing, it is a first aspect of the present invention to provide prism shields for a parabolic trough solar collector.

Another aspect of the present invention is to provide a solar receiver comprising a tube adapted to carry a heat transfer medium therethrough, a glass envelope surrounding the tube and having opposed ends, an interface disposed between each end and the tube to support the tube from the envelope, and a prism disposed over the interface so as to divert incident radiation away from the interface and toward the tube and/or the glass envelope.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 1:
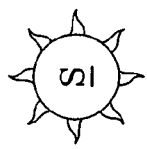
FIG. 1 is a perspective view of a parabolic trough solar collector incorporating the concepts of the present invention.
Figure 1:
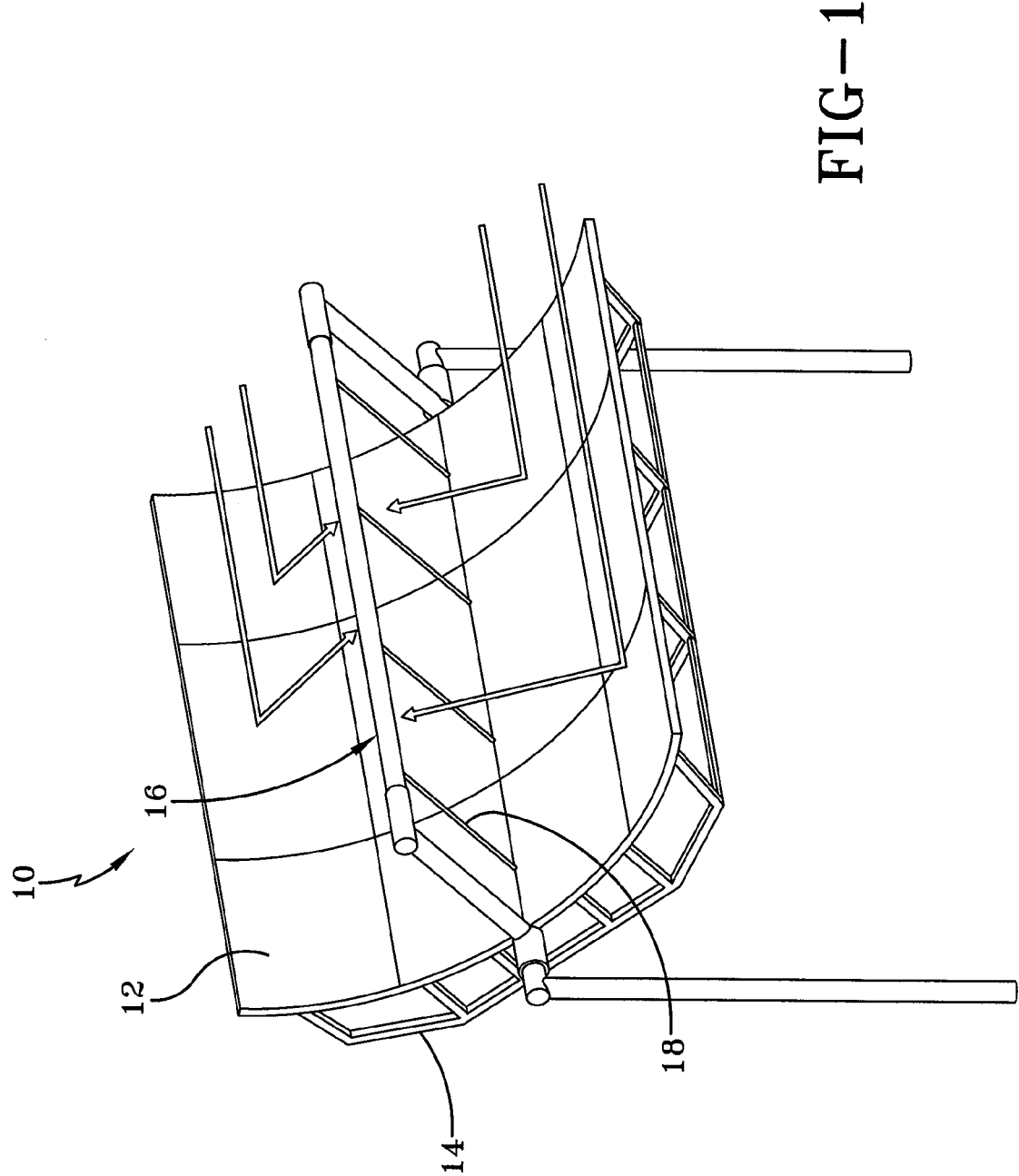

Referring now to the drawings, and in particular to FIG. 1, it can be seen that a parabolic trough solar collection assembly is designated generally by the numeral 10. The assembly 10 is part of a solar energy collection system which captures solar radiation for conversion to electrical energy or some other usable power medium. The assembly 10 includes a trough reflector 12 which is, in most embodiments, parabolic in shape. In other embodiments, the reflector could be any curved or faceted mirrored surface oriented to follow the trajectory of the Sun S. The reflector 12 may be provided in sections such that each section can be individually configured to follow the Sun's trajectory and make most efficient use of placement of the reflectors. Or the sections of the reflectors may move in tandem. Each reflector section includes a support structure 14 which is positioned on the underside of the reflector so as to support the mirrored surfaces and related attachments.

A solar receiver 16 is positioned and supported at a focal point of the reflector 12. The solar receiver or heat collection element (HCE) receives the solar radiation reflected by the mirrors. The solar receiver 16 absorbs the incident and reflected radiation rays. A strut or struts 18 may be interposed between each section of the reflector and/or may be interposed between the apex of the receivers or reflectors and the solar receiver 16. An insulator may be disposed between the strut and the pipe. The struts 18 are employed in such a manner so as to minimize radiation losses and to maintain an optimal focus position of the solar receiver 16 within the trough reflector 12.

Figure 2:
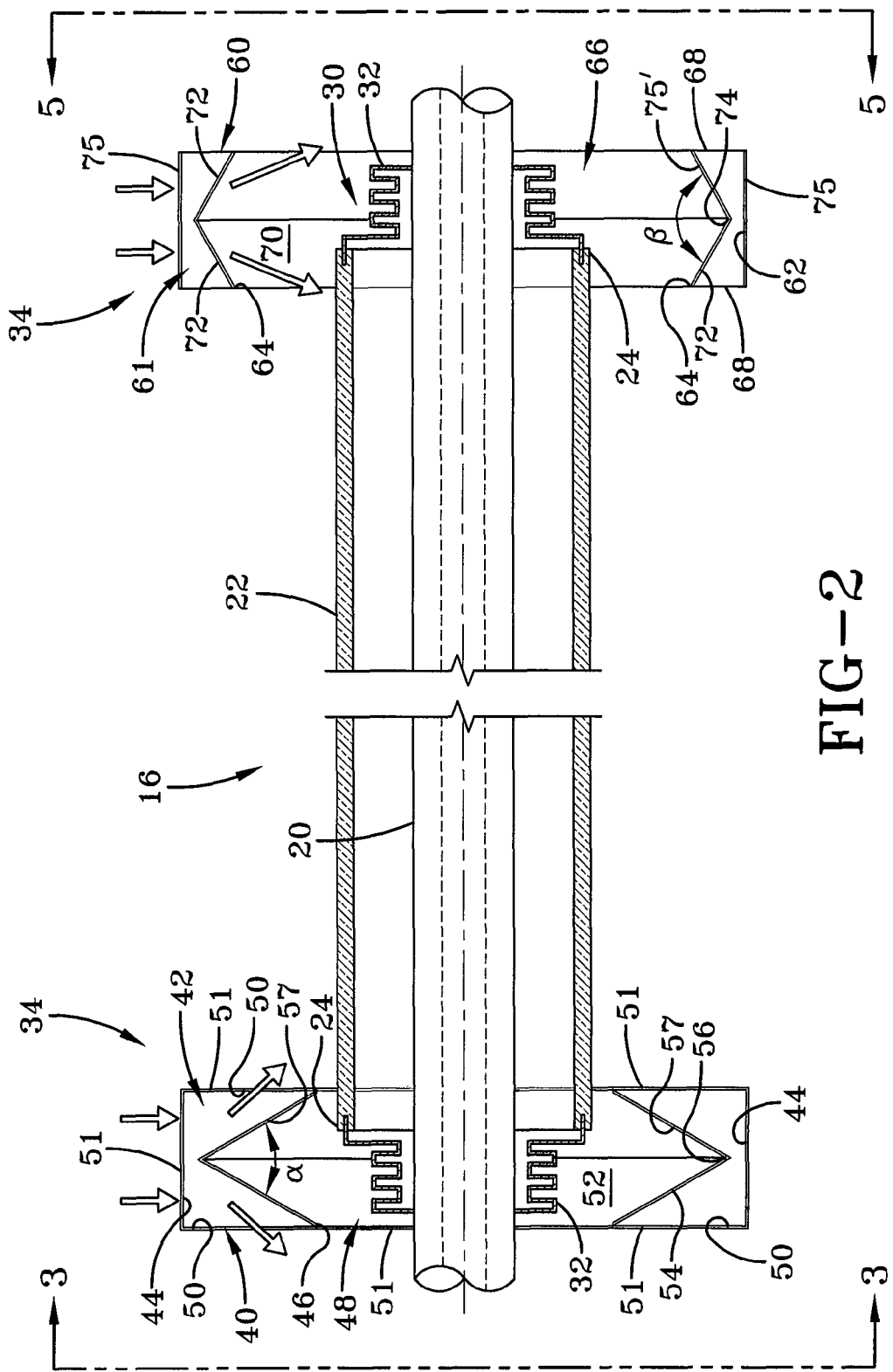
FIG. 2 is an elevational view of a solar receiver with prism shields shown in cross-section according to the concepts of the present invention.
Figure 4:
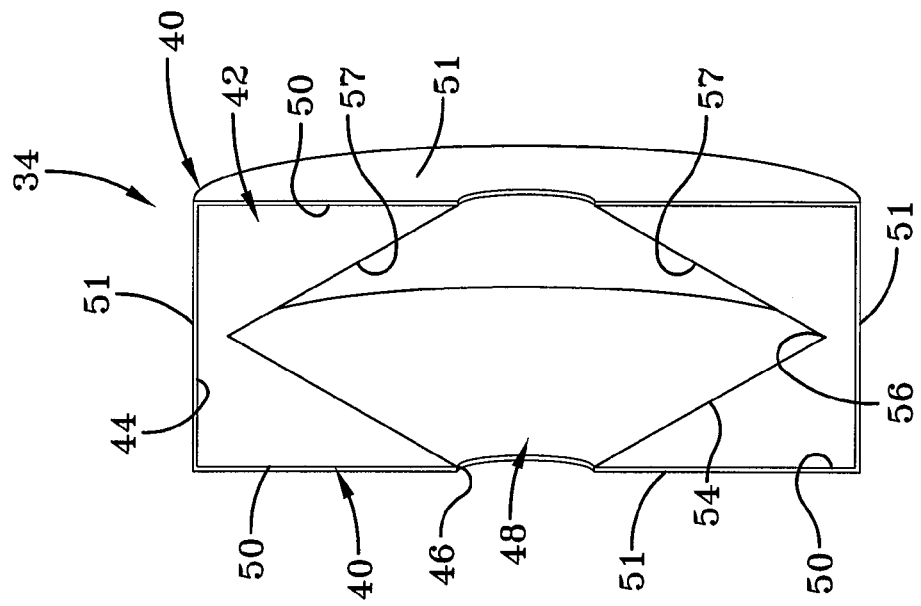
FIG. 4 is a front perspective view of the total internal reflection prism according to the concepts of the present invention.
Figure 3:
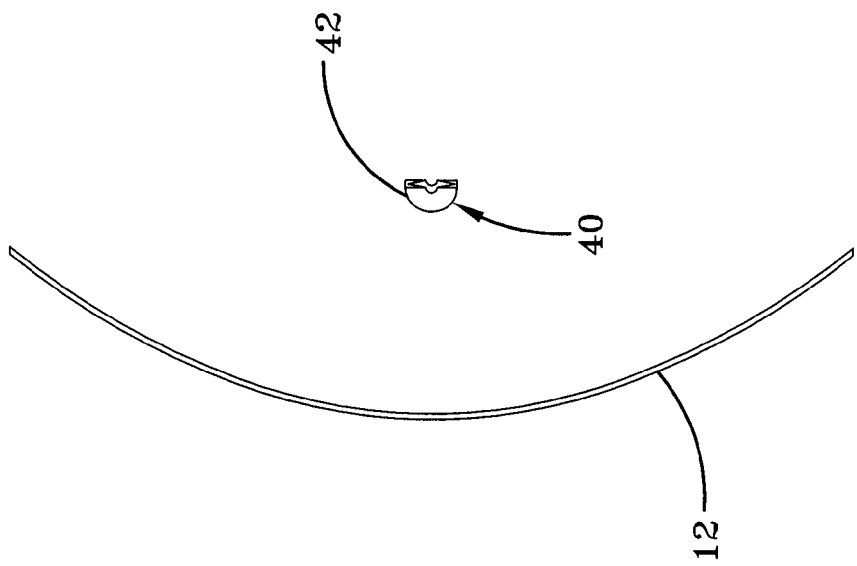
FIG. 3 is an end view of the solar receiver showing a total internal reflection prism.

Referring now to FIGS. 2-4, it can be seen that the solar receiver 16 comprises an absorber tube 20 that carries a heat transfer fluid. In most embodiments the tube 20 is of a metallic construction and is attached at each end to a heat conversion system (not shown) which converts the heat imparted into the heat transfer fluid into another usable form of energy, such as electricity. A glass envelope 22, which in the present embodiment is a hollow cylindrical configuration that maintains a vacuum, concentrically encloses the tube 20. The envelope 22 has opposed ends 24. The glass envelope forms an outer shell of the receiver 16 and in most embodiments the tube 20 is provided with a solar-selective coating. In other words, a thin coating is applied to the exterior of the tube 20 so as to maximize the amount of solar energy which is absorbed and minimizes the amount of heat which is reflected back to the glass envelope. Accordingly, the tube 20 absorbs the heat reflected from the mirrored surfaces and captures that heat so it is not released. In most embodiments the glass envelope 22 is constructed of borosilicate glass and is provided with anti-reflection coatings that are applied to both the inner and outer surfaces of the cylinder so as to minimize the amount of sunlight which is reflected off of the envelope and maximize the amount of sunlight which is transmitted to the absorber tube. Other similar glass materials could be used.

In order to maintain a sealed receiver 16 and keep the tube 20 optimally positioned within the glass envelope 22 an interface, designated generally by the numeral 30, is interposed between the ends 24 and an outer surface of the tube 20. A bellows 32 is interposed between each end 24 and an outer diameter of the tube 20. The bellows maintains a concentric spacing between the tube and the glass envelope. In particular, the bellows 32 may be a flexible metal spring which joins the tube and the envelope to one another. The bellows allows the tube and glass envelope to expand and contract at different rates—due to their different coefficients of thermal expansion—without introducing stress on the cylindrical glass material. Skilled artisans will appreciate that the bellow's axial length should be minimized so as to minimize the loss of useful sunlight. As noted in the Background Art of the present application, the glass to metal seal interface is a primary point of failure due to the stresses induced by the different expansion rates of the glass and metal.

As best seen in FIGS. 2-6, prism shields 34 are disposed over the interface 30 so as to divert radiation away from the interface and toward the tube and/or glass envelope. As schematically represented in FIG. 2, the reflected incoming solar radiation is deflected by the prism shields toward the glass tube and away from the bellows 32.

In one embodiment, as shown in FIGS. 2-4, the prism shield 34 comprises a total internal reflection prism designated generally by the numeral 40. The prism 40 includes a body 42 which may be of a circular or semi-circular configuration. The prism is positioned to at least partially surround the end of the glass envelope 22 and may be supported by the strut 18 or other similar structure maintained by the parabolic trough solar collection assembly 10. The body 42 includes an outer diameter surface 44 which primarily faces the trough reflector 12. The body further includes an inner diameter edge 46 which is positioned near the envelope 22. The inner diameter edge 46 forms an opening 48 such that the edge 46 is relatively close to the outer surface of the envelope 22 and the outer surfaces of the bellows 32.

Interconnecting the outer diameter surface 44 and the inner diameter edge 46 are a pair of sidewall surfaces 50. Anti-Reflective (AR) coatings 51 may be applied to surfaces 50 and 44 to improve sun light transmission. Disposed between the sidewall surfaces 50 is an internal cavity 52 which provides internal cavity sides 54. Each side 54 extends from a respective inner diameter edge 46 to an internal apex 56 which is aligned with about a mid-point of the bellows 32. In other words, the apex 56 is aligned with a mid-point of the bellows and the internal apex is, in most embodiments, positioned halfway between the sidewall surfaces 50. It will further be appreciated that a reflective coating 57 is disposed on the cavity sides 54 so as to precisely direct any radiation directed through the body toward the envelope 22.

As best seen at the left side of FIG. 2 and in FIGS. 3 and 4, the Sun's radiation impacts the outer diameter surface 44 and the cavity sides 54 function to internally reflect the radiation so that it is diverted away from the bellows and toward the absorptive coatings of the tube 22. In this manner, radiation is shielded or prevented from directly exposing the bellows to solar radiation and diverted toward the absorb tube 22 for more efficient collection of energy. Accordingly, this construction is advantageous in that it serves two functions. First, the prism shields the bellows from radiation. Second, diverted solar radiation is directed toward the tube 22. In the internal reflection prism embodiment, it can be seen that the inner diameter edge is closely disposed near the outer surface of the tube 22. It will be appreciated that an angle α of the cavity sides 54 and/or the width of the surface 44 may be adjusted as appropriate to provide optimum diversion. In the present embodiment the angle α is believed to be most effective when between 40 and 70 degrees. Moreover, the inner diameter edge can be placed directly in contact with the glass tube.

Figure 6:
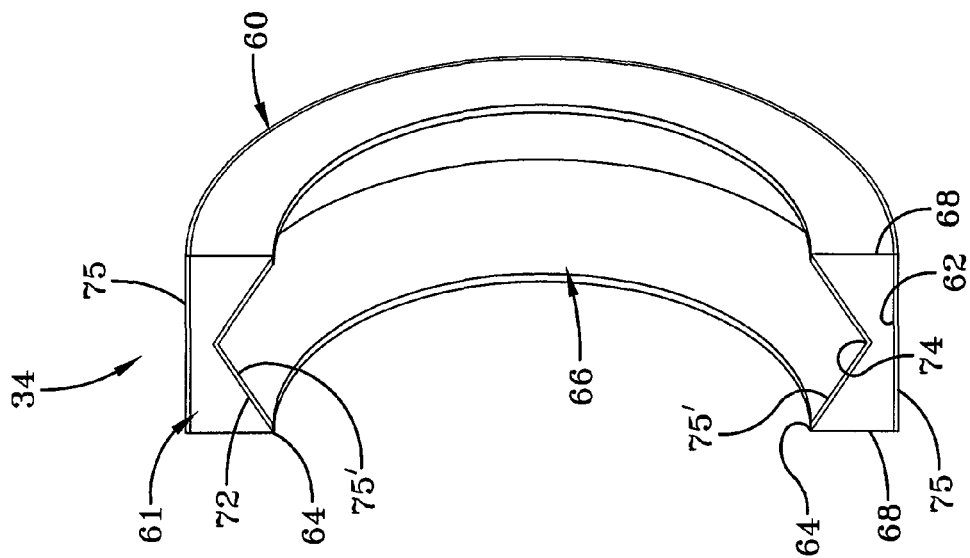
FIG. 6 is a front perspective view of the refractive prism according to the concepts of the present invention.
Figure 5:
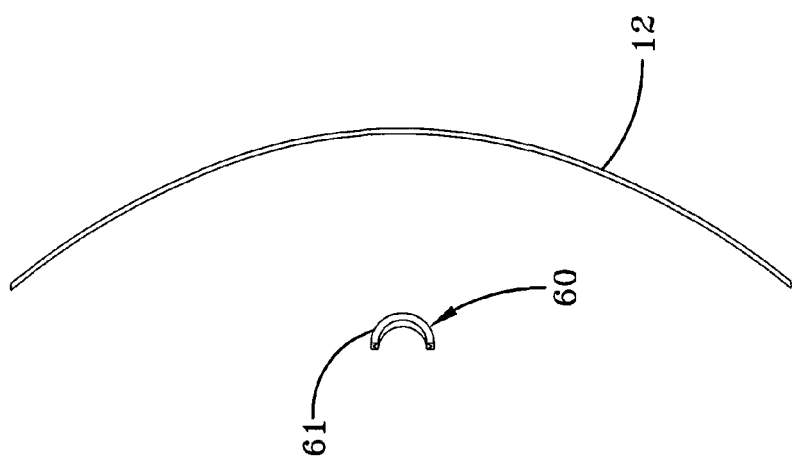
FIG. 5 is an end view of the solar receiver showing a refractive prism.

Referring now to FIGS. 2, 5 and 6 it can be seen that an alternative embodiment of the prism shield 34 may be in the form of a refractive prism designated generally by the numeral 60. The prism 60 is configured in much the same manner as the prism 40 but with slightly different structural features. The prism 60 includes a body designated generally by the numeral 61, which has an outer diameter surface 62 and an inner diameter edge 64. The inner diameter edge 64 is spaced relatively closer to the outer diameter surface 62 so as to provide a larger opening 66 than the opening provided in the embodiment associated with the prism 40. Sidewall surfaces 68 connect both edges of the outer diameter surface 62 and the inner diameter edges 64. Contiguous with the opening 66 and maintained within the prism 60 is an internal cavity 70. The cavity 70 is formed by cavity sides 72 which extend from a respective edge 64 and are joined to one another at an internal apex 74. In contrast to the other embodiment, the cavity sides 72 are not provided with a reflective coating. Instead, the prism's refractive properties are permitted to divert radiation incident on the surface 62 toward the envelope 22, but still away from the bellows 32. Anti-reflective coatings 75 and 75' can be used on surface 62 and 72 to augment light transmission through the prism and to preclude any reflection of light that may emanate from some other surface and back toward the bellows. The apex 74 is positioned medially between the surfaces 68 and positioned along the solar receiver 16 such that it is at about a mid-point of the bellows 32.

The refractive properties of the prism 60 are employed so that reflected radiation incident on the outer diameter surface 62 is refracted away from the bellows toward the absorptive properties of the glass tube 22. The inner diameter edge 62 is significantly spaced away from the outer diameter of the tube 22 so as to take full advantage of the refractive properties of the prism in diverting the solar radiation away from the bellows or glass-metal interface. In the present embodiment angle β of the cavity sides 72 with respect to one another is somewhere between 100 and 140 degrees. And in the present embodiment the edges 64 are spaced apart from the envelope anywhere from 5.5 to 7 inches. Of course, other spacing could be used. This configuration is advantageous for the same reasons as the other prism.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A solar receiver comprising:
   a tube adapted to carry a heat transfer medium therethrough;
   a glass envelope surrounding said tube and having opposed ends;
   an interface disposed between each said end and said tube to support said tube from said envelope; and
   a prism having at least a semi-circular body that has an outer diameter and an inner diameter that forms an opening, wherein said opening concentrically receives and is disposed over said interface so as to allow incident radiation to pass through said body and divert incident radiation away from said interface and toward said tube and/or said glass envelope.

2. The assembly according to claim 1, wherein said interface comprises a bellows having one end coupled to said tube and an opposite end coupled to one of said envelope ends; and
   said opening concentrically receiving at least a portion of said glass envelope and said bellows.

3. The assembly according to claim 2, wherein said inner diameter is in relatively close proximity to said glass envelope.

4. The assembly according to claim 3, wherein said inner diameter is directly in contact with said glass envelope.

5. The assembly according to claim 3, wherein said body further comprises:
   opposed sidewall surfaces extending between said outer diameter surface and said inner diameter edges, said body having an internal cavity contiguous with said opening.

6. The assembly according to claim 5, further comprising angular cavity sides which extend from said inner diameter edge toward said outer diameter surface and converge at an internal apex so as to form said angular cavity.

7. The assembly according to claim 6, wherein an angle at said internal apex of said angular cavity sides is no greater than 70 degrees.

8. The assembly according to claim 5, wherein said angular cavity sides have a reflective coating disposed thereon.

9. The assembly according to claim 2, wherein said inner diameter is spaced apart from said glass envelope.

10. The assembly according to claim 9, wherein said inner diameter is spaced at least 5½ inches from said glass envelope.

11. The assembly according to claim 9, wherein said body further comprises:
    opposed sidewall surfaces extending between said outer diameter surface and said inner diameter edges, said body having an internal cavity contiguous with said opening.

12. The assembly according to claim 11, further comprising angular cavity sides which extend from said inner diameter edge toward said outer diameter surface and converge at an internal apex so as to form said angular cavity.

13. The assembly according to claim 12, wherein an angle between said internal cavity sides is no greater than 140 degrees.

14. The assembly according to claim 12, wherein at least said angular cavity sides or said outer diameter surface has an anti-reflective coating.

* * * * *